United States Patent
Bryan et al.

(10) Patent No.: US 7,510,462 B2
(45) Date of Patent: Mar. 31, 2009

(54) MULTI-DIAMOND CUTTING TOOL ASSEMBLY FOR CREATING MICROREPLICATION TOOLS

(75) Inventors: William J. Bryan, Mahtomedi, MN (US); Nelson D. Sewall, Forest Lake, MN (US); Jeffrey E. Clements, New Richmond, WI (US); Greg E. Schrank, Bloomington, MN (US); Jennifer L. Trice, Eagan, MN (US); Timothy L. Hoopman, River Falls, WI (US); Charles N. DeVore, Hugo, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 11/454,319

(22) Filed: Jun. 16, 2006

(65) Prior Publication Data
US 2006/0234605 A1 Oct. 19, 2006

Related U.S. Application Data

(62) Division of application No. 10/241,247, filed on Sep. 10, 2002, now abandoned.

(51) Int. Cl.
*B24B 1/00* (2006.01)
(52) U.S. Cl. ............... 451/48; 29/557; 72/325; 72/370.21; 125/13.01; 125/22; 125/30.01; 409/131; 451/49
(58) Field of Classification Search .......... 29/557, 29/527.3; 33/18.1; 51/294; 83/13, 56; 125/11.18, 125/12, 13.01, 22, 30.01; 359/530; 407/65, 407/113, 119; 409/431, 131; 451/41, 48, 451/49, 178, 194, 195; 72/185, 203, 325, 72/370.21
See application file for complete search history.

(56) References Cited

U.S. PATENT DOCUMENTS

| 1,348,115 A | 7/1920 | Hutchinson |
| 2,738,730 A | 3/1956 | Boyajean |

(Continued)

FOREIGN PATENT DOCUMENTS

CH 359899 3/1962

(Continued)

OTHER PUBLICATIONS

Information Disclosure Statement—Declaration by Applicant William J. Bryan.

(Continued)

*Primary Examiner*—Timothy V Eley
(74) *Attorney, Agent, or Firm*—Lance L. Vietzke

(57) ABSTRACT

In one embodiment, a cutting tool assembly used for creating grooves in a microreplication tool is described. The cutting tool assembly includes a mounting structure and multiple diamonds mounted in the mounting structure. For example, first and second tool shanks having first and second diamond tips can be positioned in the mounting structure such that a cutting location of a diamond cutting tip of the first tool shank is a defined distance from a cutting location of a diamond cutting tip of the second tool shank. The defined distance may correspond to an integer number of pitch spacings, and may be accurate to within a tolerance of less than approximately 10 microns.

18 Claims, 14 Drawing Sheets

U.S. PATENT DOCUMENTS

| | | |
|---|---|---|
| 3,680,213 A | 8/1972 | Reichert |
| 3,780,409 A | 12/1973 | Bartoszevicz |
| 3,813,970 A | 6/1974 | Mitchell |
| 3,893,356 A | 7/1975 | Atzberger |
| 4,035,590 A | 7/1977 | Halter |
| 4,044,379 A | 8/1977 | Halter |
| 4,111,083 A | 9/1978 | Carter |
| 4,113,266 A | 9/1978 | Alexandrovich |
| 4,113,267 A | 9/1978 | Wittenberg |
| 4,287,689 A | 9/1981 | Mindel et al. |
| 4,355,382 A | 10/1982 | Dholakia et al. |
| 4,504,940 A | 3/1985 | Nishiguchi et al. |
| 4,525,751 A | 6/1985 | Freeman et al. |
| 4,863,321 A | 9/1989 | Lieser |
| 5,216,843 A | 6/1993 | Breivogel et al. |
| 5,555,473 A | 9/1996 | Seitz |
| 5,663,802 A | 9/1997 | Beckett et al. |
| 5,665,656 A * | 9/1997 | Jairath ................ 438/692 |
| 5,814,355 A | 9/1998 | Shusta |
| 5,958,799 A | 9/1999 | Russell et al. |
| 6,110,030 A | 8/2000 | Hashimoto |
| 6,140,655 A | 10/2000 | Russell et al. |
| 6,253,442 B1 | 7/2001 | Benson et al. |
| 6,325,575 B1 | 12/2001 | Pawlik |
| 6,337,281 B1 | 1/2002 | James et al. |
| 6,379,592 B1 | 4/2002 | Lundin |
| 6,461,224 B1 * | 10/2002 | Frost et al. ............ 451/41 |
| 6,500,054 B1 | 12/2002 | Ma et al. |
| 6,551,176 B1 | 4/2003 | Garretson |
| 6,620,029 B2 * | 9/2003 | Khoury et al. .......... 451/6 |

FOREIGN PATENT DOCUMENTS

| | | |
|---|---|---|
| DE | 885 163 | 7/1949 |
| DE | 1012452 | 12/1965 |
| EP | 0830946 | 3/1998 |
| EP | 1 092 515 | 5/2003 |
| FR | 967 169 | 10/1950 |
| WO | WO 89/04052 | 5/1989 |
| WO | WO 96/32741 | 10/1996 |

OTHER PUBLICATIONS

Dave P. Adams et al., "Focused Ion Beam Shaped Micro-Cutting Tools for Fabricating Curvilinear Features".

Proceedings of the Fifteenth Annual Meeting of the American Society for Precision Engineering; 2000, vol. 22, p. 176-179; Publisher—American Society for Precision Engineering Raleigh, NC. USA.

Dave P. Adams et al., "Microgrooving and Microthreading Tools for Fabricating Curvlinear Features", Precision Engineering, Oct. 2000, vol. 24, Issue 4, p. 347-356; Publisher—Elsevier USA.

Michael J. Vasile, et al., Microfabrication Techniques Using Focused Ion Beams and Emergent Applications, Micron, Jun. 1999, vol. 30, Issue 3, p. 235-244, Publisher—Pergamon/Elsevier USA.

Michael J. Vasile et al., "Focused Ion Beam Technology Applied to Microstructure Fabrication", J. Vac. Sci. Technology B., vol. 16, No. 4, Jul./Aug. 1998, p. 2499-2505, Publisher—American Institute Physics, USA.

Michael J. Vasile et al., "Microfabrication by Ion Milling: The Lathe Technique", J. Vac. Sci. Technology B., vol. 12, No. 4, Jul./Aug. 1994, p. 2388-2393, Publisher—American Institute Physics, USA.

Voosuf N. Picard et al., "Focused Ion Beam-Shaped Microtools for Ultra-Precision Machining of Cylindrical Components": Precision Engineering, Jan. 2003, vol. 27, Issue 1, p. 59-69, Publisher—Elsevier USA.

"Ultra fine finishing of diamond tools by ion beams," Precision Engineering, vol. 9, No. 2, pp. 71-78, Apr. 1987.

* cited by examiner

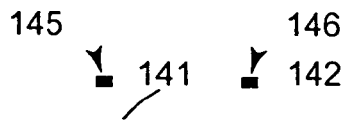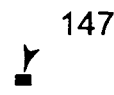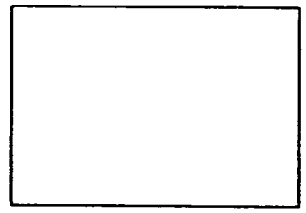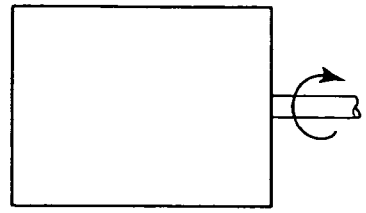
Fig. 14
Fig. 15
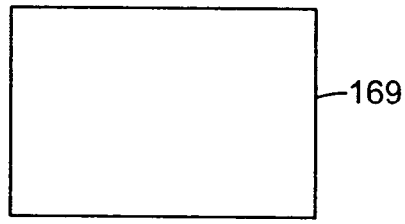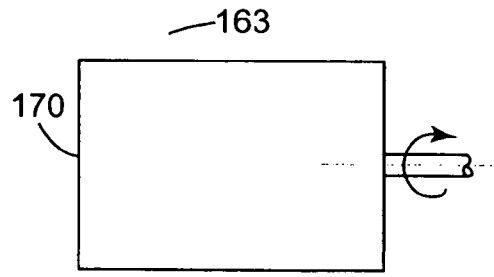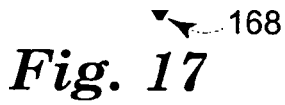
Fig. 16
Fig. 17
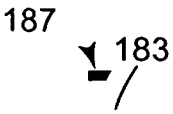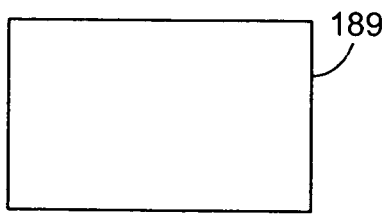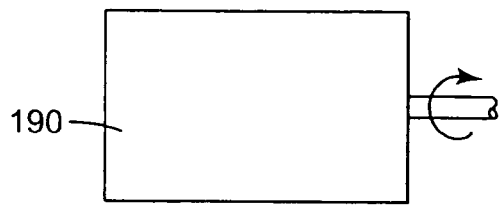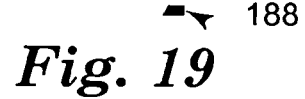
Fig. 18
Fig. 19

MULTI-DIAMOND CUTTING TOOL ASSEMBLY FOR CREATING MICROREPLICATION TOOLS

CROSS-REFERENCE TO RELATED APPLICATIONS

This Application is a Divisional Application of application Ser. No. 10/241,247, filed Sep. 10, 2002, now abandoned, the entire content of which is incorporated herein by reference.

FIELD

The invention relates to diamond machining of microreplication tools used in creating microreplicated structures.

BACKGROUND

Diamond machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

Microreplication tools include casting belts, casting rollers, injection molds, extrusion or embossing tools, and the like. Microreplication tools can be created by a diamond machining process in which a cutting tool assembly is used to cut grooves or other features into the microreplication tool. The process of creating a microreplication tool using a cutting tool assembly can be costly and time consuming.

SUMMARY

In general, the invention is directed to cutting tool assemblies that include multiple diamonds. The cutting tool assembly having multiple diamonds can be used in creating microreplication tools or other work pieces. In particular, the multiple diamonds of the cutting tool assembly can be used to create multiple grooves or other features in a microreplication tool during a single cutting pass of the assembly. With the ability to form multiple features in a single cutting pass, a cutting tool assembly with multiple diamonds can reduce production time and/or create more complex patterns.

The cutting tool assembly may include a mounting structure and multiple tool shanks mounted in the mounting structure. Each of the tool shanks can define a diamond tip used as a cutting tip of the cutting tool assembly. The diamond cutting tips of the tool shanks may be precisely formed to correspond to grooves or other features to be created in the microreplication tool. Moreover, the tool shanks may be precisely positioned in the mounting structure such that cutting locations of the tips of the different diamonds are one or more pitch spacings apart from one another. Accordingly, the different diamond tips of the cutting tool assembly may correspond to different grooves or features to be created in the microreplication tool with pitch spacings defined by the cutting locations of the diamond tips.

By using multiple diamond cutting tips in the same assembly, the creation of the microreplication tool may be improved or simplified. In particular, fewer cutting passes of the cutting tool assembly may be needed to cut the grooves in the microreplication tool, which can reduce tooling costs. For example, if the cutting tool assembly includes two diamonds, the number of passes required to cut the grooves in the microreplication tool can be reduced by one-half.

In addition, in some embodiments, the different diamond tips may define different features to be created in the microreplication tool. In that case, the use of different cutting tool assemblies to create two or more physically distinct features may be avoided, and a single assembly can be used instead to create two or more physically distinct features in the microreplication tool. Such techniques may improve the quality of the microreplication tool and can reduce the time and costs associated with the creation of the microreplication tool, which in turn, may effectively reduce the costs associated with the ultimate creation of microreplicated structures.

Additional details of these and other embodiments are set forth in the accompanying drawings and the description below. Other features, objects and advantages will become apparent from the description and drawings, and from the claims.

BRIEF DESCRIPTION OF THE DRAWINGS

FIGS. 14-27 are additional cross-sectional top views illustrating multi-diamond cutting tool assemblies according to various embodiments of the invention.

DETAILED DESCRIPTION

Figure 1:
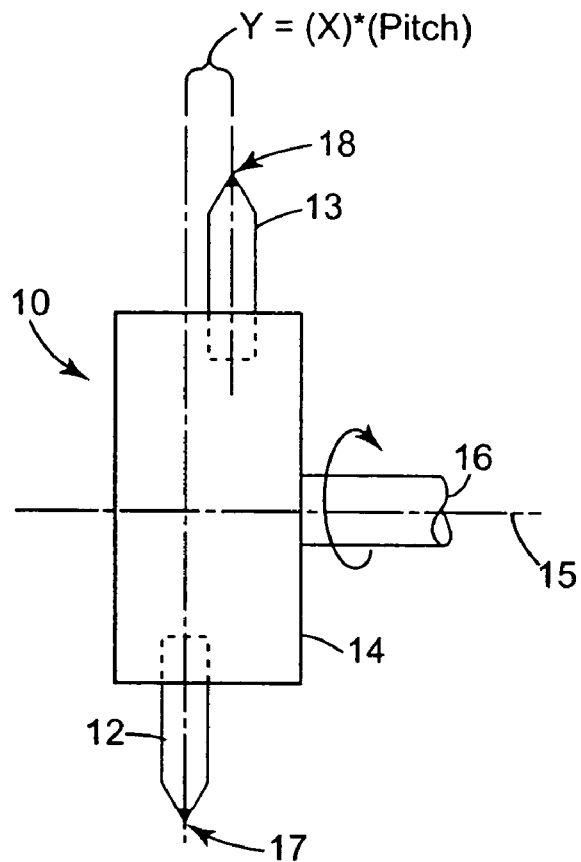
FIG. 1 is a top view of a multi-diamond cutting tool assembly configured for fly-cutting.

The invention is directed to cutting tool assemblies that include multiple diamonds. The cutting tool assembly can be used to create microreplication tools or other work pieces. In particular, the cutting tool assembly can be used to cut a plurality of grooves or other features during the creation of a microreplication tool with a single cutting pass of the cutting tool assembly. Thus, the cutting time associated with the creation of a microreplication tool can be reduced, or more complex patterns can be formed in a given period of time. In this manner, the production cycle associated with the ultimate creation of microreplication structures can be reduced, and the production process may be simplified. In addition, in some embodiments, the different diamonds may define different features to be created in the microreplication tool. In that case, the use of distinct cutting tool assemblies may be avoided, and a single, multi-faceted cutting tool assembly can be used instead to create two or more physically distinct features in the microreplication tool.

The cutting tool assembly may include a mounting structure, and multiple tool shanks mounted in the mounting structure. Each tool shank defines a distinct diamond tip, and the different tips may correspond to different grooves or other features to be created in the microreplication tool. The cutting tool assembly may assume different configurations, depending on whether it is designed for flycutting or plunge or thread cutting.

The tips of the diamonds in the tool shanks can be formed using lapping techniques, grinding techniques, or focused ion beam milling processes. Various shapes and sizes of the diamond tips are also described, which may be useful in the creation of different microreplication tools. Focused ion beam milling processes, in particular, may be used to perfect the desired shapes of the diamond tips with extreme accuracy.

The different tool shanks of the cutting tool assembly can be mounted in a mounting structure using microscopic positioning techniques. For example, the techniques may involve the use of a tooling microscope with positioning controls. The microscope can be used to identify and measure the position of the diamond tips relative to one another so that the tool shanks can be properly positioned within the mounting structure. Positioning feedback can be provided to quantify the positioning of the diamond tips, e.g., in the form of a digital readout, analog readout, graphic display, or the like. The feedback can be used to precisely position the different tool shanks in the mounting structure. Once positioned, the tool shanks can be secured in the mounting structure by any suitable securing mechanism. In this manner, the tool shanks can be positioned in the mounting structure such that a cutting location of a first diamond tip is a defined distance from a cutting location of a second diamond tip. The defined distance may correspond to an integer number of pitch spacings, and may be accurate to within a tolerance of less than approximately 10 microns.

The use of a microscope and positioning feedback to precisely position the multiple tool shanks within the mounting structure can ensure placement of the diamond tips relative to one another to tolerances required for effective tooling of microreplication tools. In particular, positioning to locations within tolerances of less than 10 microns, and more preferably less than 1 micron can be achieved. Moreover, positioning of the diamond tips to locations relative to one another within tolerances on the order of 0.5 microns can be achieved using a tooling microscope like that described herein. Such precision placement is desirable for effective creation of microreplication tools that can be used for creating a wide variety of microreplicated structures such as microreplicated optical films, microreplicated mechanical fasteners, microreplicated abrasive films, microreplicated adhesive films, or the like.

The creation of cutting tool assemblies having multiple diamonds in the assembly can improve and simplify the creation of microreplication tools by reducing the number of cutting passes of the assembly needed to create the grooves on the microreplication tool. Such simplification can effectively reduce the costs associated with the ultimate creation of microreplicated structures.

FIG. 1 is a top view of a cutting tool assembly 10 that includes two tool shanks 12 and 13 mounted in a mounting structure 14. Cutting tool assembly 10 is configured for flycutting in which assembly 10 is rotated about an axis 15. For example, assembly 10 may be mountable to a drive shaft 16, which can be driven by a motor of a tooling machine (not shown) to rotate assembly 10. Mounting structure 14 may comprise a structure for holding tool shanks 12 and 13, that have diamond tips 17, 18. The shanks 12, 13 may be formed from a metallic or composite material, and diamonds can be secured to shanks 12, 13 by a substantially permanent securing mechanism. In addition, mounting structure 14 may include features to enable attachment to drive shaft 16.

In order to secure the diamonds in tool shanks 12, 13 and thereby define diamond tips 17, 18, a substantially permanent securing mechanism can be used such as, brazing, soldering, an adhesive such as an epoxy, or the like. The tool shanks 12, 13 with diamond tips 17, 18, can then be mounted in mounting structure 14 via a temporary securing mechanism such as one or more bolts, clamps or set screws. Alternatively brazing, soldering, an adhesive such as an epoxy, or another more permanent securing mechanism may be used to secure tool shanks 12, 13 in mounting structure 14. In any case, the use of a tooling microscope with positioning controls and positioning feedback can ensure that tool shanks 12 and 13 are positioned within mounting structure 14 such that diamond tips 17, 18 are positioned relative to one another with the precision required for effective manufacture of microreplication tools. Mounting structure 14 may have a shape that allows cutting tool assembly 10 to be inserted into a diamond tooling machine. Again, the diamond tooling machine may be a diamond turning machine configured for fly-cutting in which the cutting tool assembly is rotated about an axis via drive shaft 16.

Each diamond tip 17 and 18 of tool shanks 12 and 13, respectively, defines a separate cutting mechanism that defines the creation of a distinct feature of a work piece such as a groove in a microreplication tool being created. In the embodiment illustrated in FIG. 1, cutting tool assembly 10 includes two tool shanks 12, 13, each having one diamond tip 17 and 18, although additional tool shanks with diamond tips may be used in accordance with the principles of the invention. In addition, the principles described below may be extended for use with diamonds that define more than one cutting tip per diamond.

As illustrated in FIG. 1, the tool shanks 12 and 13 are positioned in mounting structure 14 such that a cutting location of tip 17 of tool shank 12 is a defined distance from a cutting location of tip 18 of tool shank 13. In particular, the defined distance may correspond to an integer number of pitch spacings. In general, the term "pitch" in this disclosure refers to the distance between two adjacent features to be created in a work piece. As shown in FIG. 1, distance Y=X* (Pitch), where X is an integer. The distance Y is also sometimes referred to as a pitch, e.g., the pitch of cutting tool assembly 10, although such terminology will be generally avoided in this disclosure for clarity. In other words, unless otherwise specified, the term "pitch" when used herein is reserved for reference to the distance between two adjacent features to be created in a work piece. The distance Y would be equal to the pitch of features in a work piece when the integer X is chosen to be equal to one.

Tool shanks 12 and 13 can be positioned in mounting structure 14 such that a cutting location of diamond tip 17 of tool shank 12 is an integer number of pitch spacings from a cutting location of diamond tip 18 of tool shank 13. More specifically, diamond tips 17, 18 can be positioned relative to one another to within a tolerance of less than 10 microns, or less than 1 micron, such as to a tolerance on the order of 0.5 microns. Such precision placement may be desirable for effective creation of microreplication tools used for creating microreplicated structures such as optical films, adhesive films, abrasive films, mechanical fasteners, or the like. Depending on the dimensions of the microreplication tool to be created, the pitch spacing may be less than approximately 5000 microns, less than approximately 1000 microns, less than approximately 500 microns, less than approximately 200 microns, less than approximately 100 microns, less than approximately 50 microns, less than approximately 10 microns, less than approximately 5 microns, less than approximately 1 micron, and may approach the tolerance of 0.5 micron spacing of diamond tips 17, 18.

Figure 2:
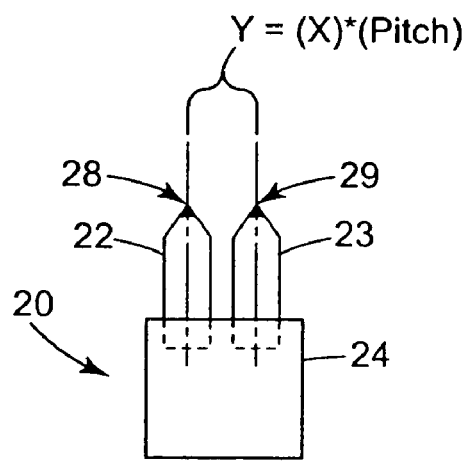
FIG. 2 is a top view of a multi-diamond cutting tool assembly configured for plunge or thread cutting.

FIG. 2 is a top view of a multi-diamond cutting tool assembly configured for plunge or thread cutting. In plunge cutting, cutting tool assembly 20 is plunged into a moving work piece at defined locations for intervals of time before moving to other locations to cut various grooves or other features. Thread cutting is similar to plunge cutting. However, in thread cutting, cutting tool assembly 20 is displaced into a moving work piece for longer periods of time to cut long threaded grooves. Cutting tool assembly 20 may also be used for scribing or ruling, in which case cutting tool assembly 20 is displaced through a work piece very slowly.

Like assembly 10 of FIG. 1, cutting tool assembly 20 of FIG. 2 includes multiple tool shanks 22 and 23 secured within a mounting structure 24. In order to secure the diamonds in tool shanks 22, 23 and thereby define diamond tips 28, 29, a substantially permanent securing mechanism can be used such as, brazing, soldering, an adhesive such as an epoxy, or the like. The tool shanks 22, 23 with diamond tips 28, 29, can then be mounted in mounting structure 24 via a temporary securing mechanism such as one or more bolts, clamps or set screws. Alternatively brazing, soldering, an adhesive such as an epoxy, or another more permanent securing mechanism may be used to secure tool shanks 22, 23 in mounting structure 24.

The use of a tooling microscope with positioning feedback can ensure that diamond tips 28, 29 of tool shanks 22 and 23 are positioned within mounting structure 24 with the precision required for effective tooling of microreplication tools. Mounting structure 24 may have a shape that allows cutting tool assembly 20 to be inserted into a diamond tooling machine configured for plunge cutting, thread cutting, scribing or ruling.

Figure 3:
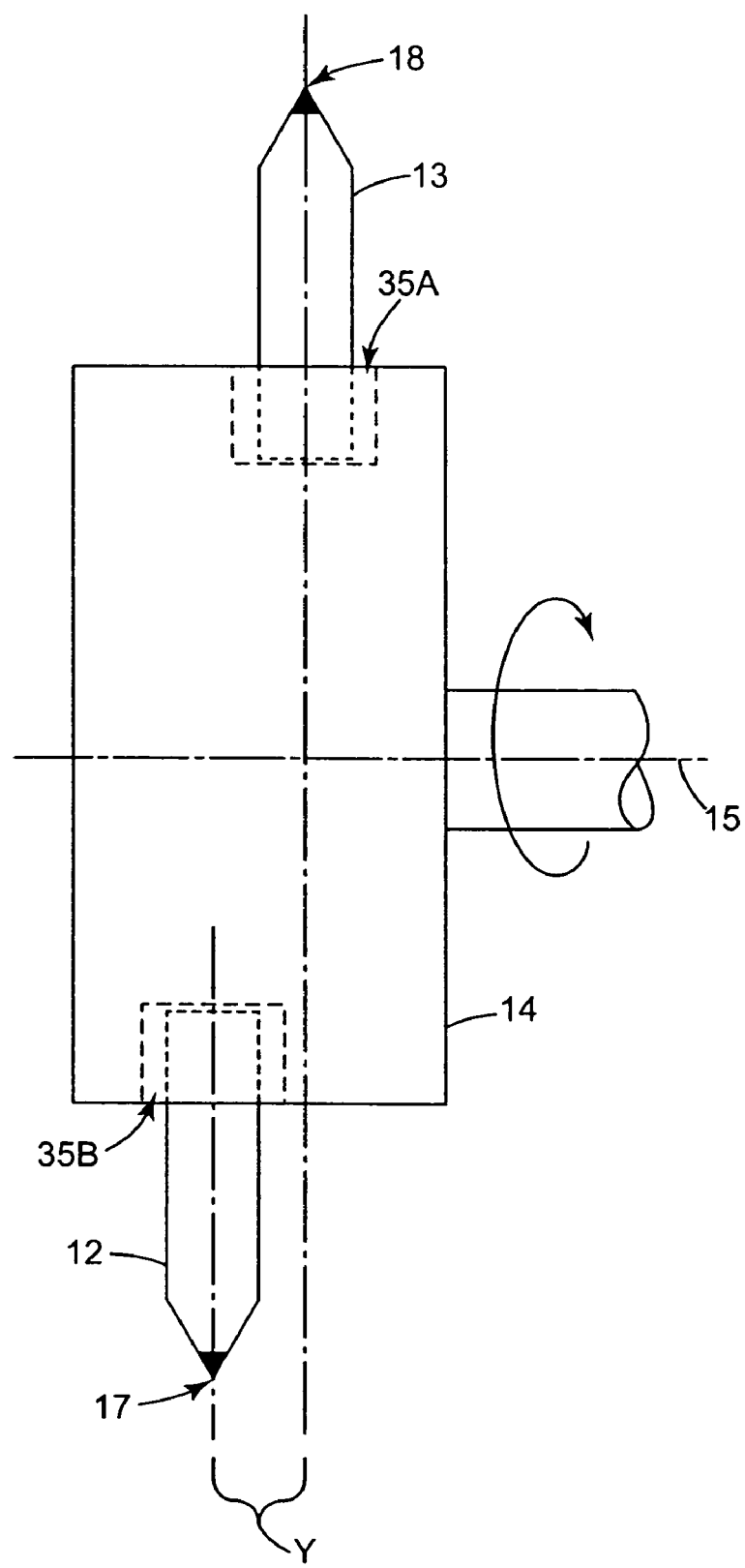
FIG. 3 is a more detailed top cross-sectional view of one embodiment of a multi-diamond cutting tool assembly configured for fly-cutting.
Figure 4:
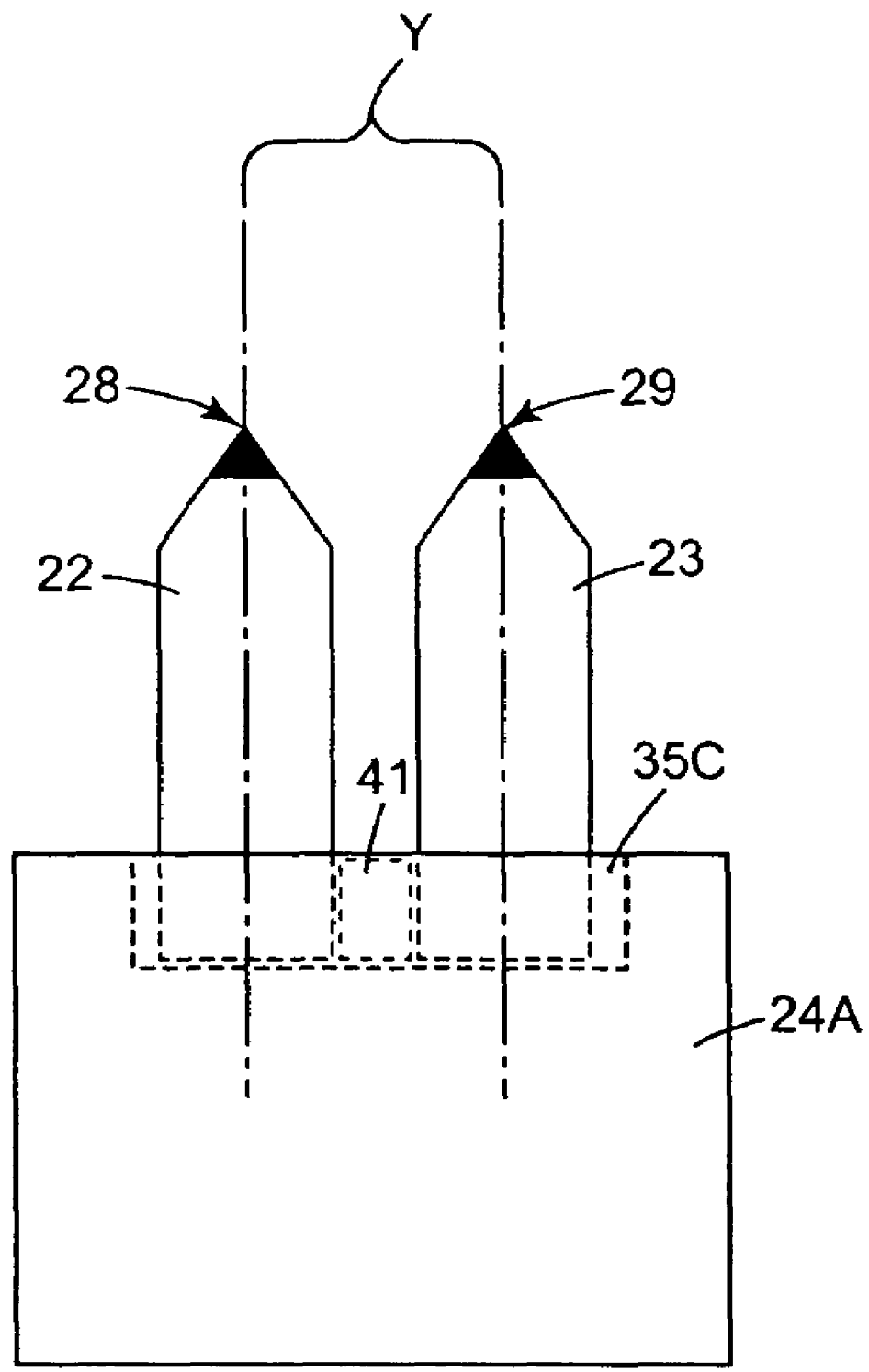
FIGS. 4 and 5 are more detailed top cross-sectional views of embodiments of a multi-diamond cutting tool assembly configured for plunge or thread cutting.
Figure 5:
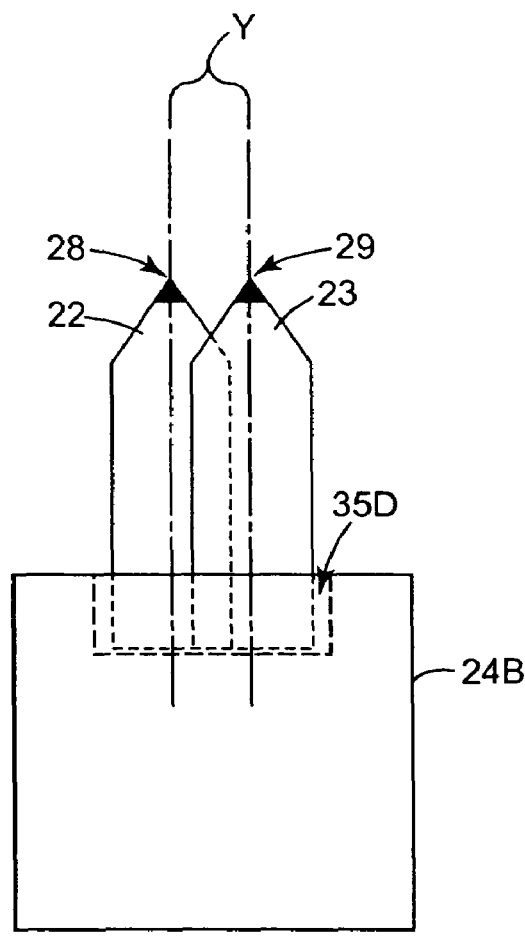
Figure 6:
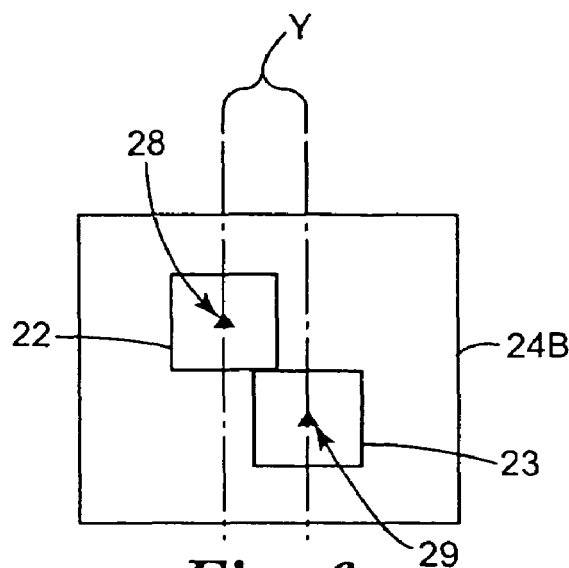
FIG. 6 is a front view of the embodiment illustrated in FIG. 5.

FIG. 3 is a more detailed top cross-sectional view of one embodiment of a multi-diamond cutting tool assembly configured for fly-cutting. FIGS. 4 and 5 are more detailed top cross-sectional view of embodiments of a multi-diamond cutting tool assembly configured for plunge or thread cutting. FIG. 6 is a front view of the embodiment illustrated in FIG. 5. In each case, mounting structure 14, 24A, 24B may include one or more areas 35A, 35B, 35C, 35D (collectively areas 35) to receive the respective tool shanks. Areas 35 may be slightly larger than the respective tool shanks in order to ensure that the tool shanks can be moved within the areas to properly position the diamond tips before the shanks are fixed in place. One or more spacers 41 (FIG. 4) may also be positioned in areas 35, if desired.

In order to position the tool shanks 12, 13 or 22, 23 within the respective mounting structure 14, 24, 24A or 24B, a tooling microscope can be used. For example, a Nikon Tool Maker's Microscope commercially available from Fryer Company of Edina, Minn. includes controlling dials for micro-measuring distances of the diamond cutting tips of tool shanks relative to one another. Moreover, feedback of the positioning can be provided and quantified by a Quadra Chex 2000 digital readout device, commercially available from Metronics Inc. of Manchester N.H., in order to ensure that variable Y is defined to within the accuracy required for effective creation of microreplication tools. The use of Nikon Tool Maker's Microscope and the Quadra Chex 2000 digital readout device can measure precision alignment of the tool shanks within the mounting structure such that diamond tips associated with the tool shanks are positioned relative to one another to within tolerances on the order of 0.5 microns. In particular, achieving alignment of the diamond tips to tolerances less than 10 microns, and more preferably less than 1 micron is desirable to create effective microreplication tools that can be used to create optical films, mechanical fasteners, abrasive films, adhesive films or the like. This micro-positioning can be achieved both laterally and vertically so that the diamond tips are correctly positioned laterally relative to one another to define the desired pitch, and vertically relative to one another to ensure desired cutting heights for the respective tips. Both lateral and vertical positioning can be achieved to within the tolerances described herein. Once properly positioned under the microscope using the digital readout, the tool shanks can be secured into the mounting structure via one or more bolts, clamps, or set screws. Alternatively, brazing, soldering, an adhesive such as an epoxy, or any other securing mechanism can be used.

Figure 7:
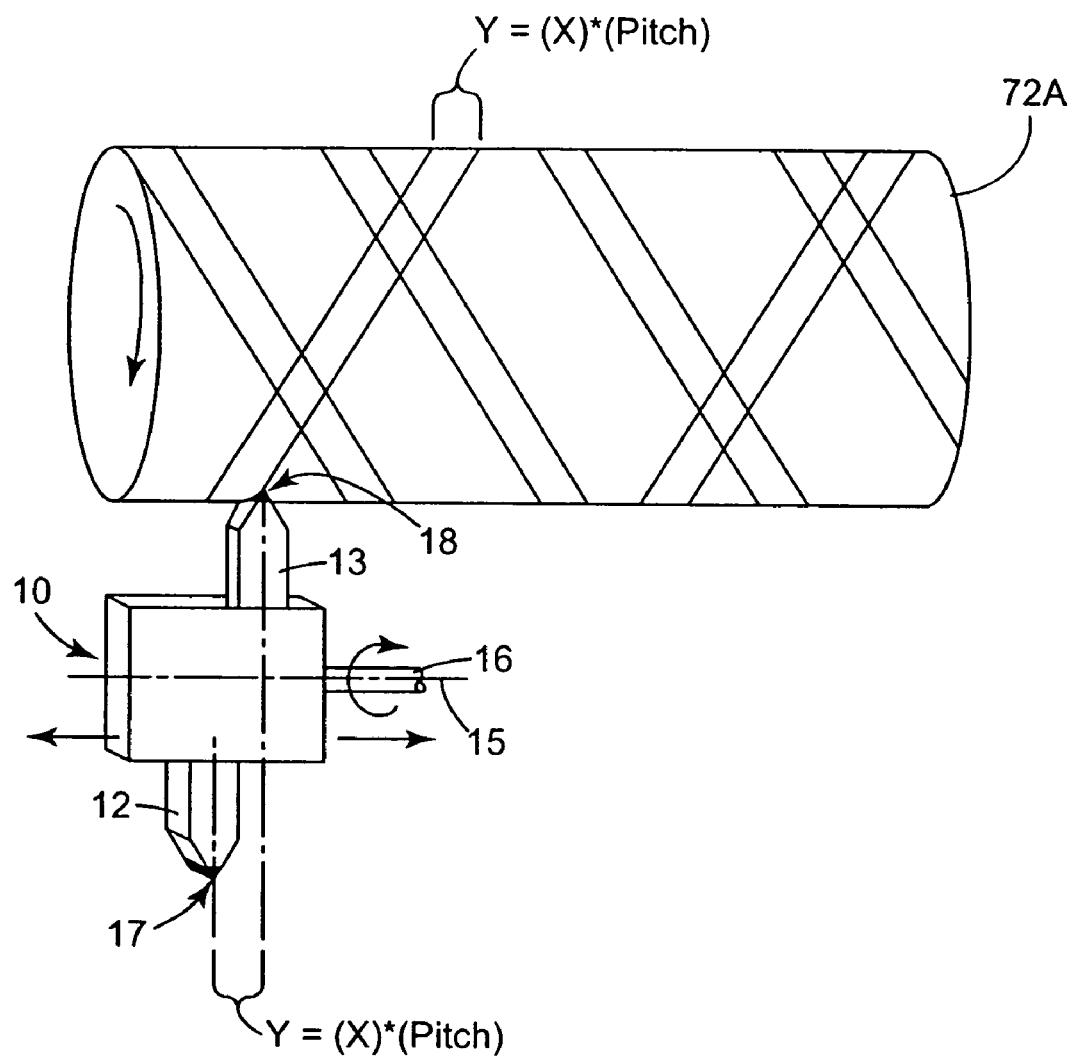
FIG. 7 is a conceptual perspective view of a multi-diamond fly cutting tool assembly simultaneously cutting two grooves during the creation of a microreplication tool.
Figure 8:
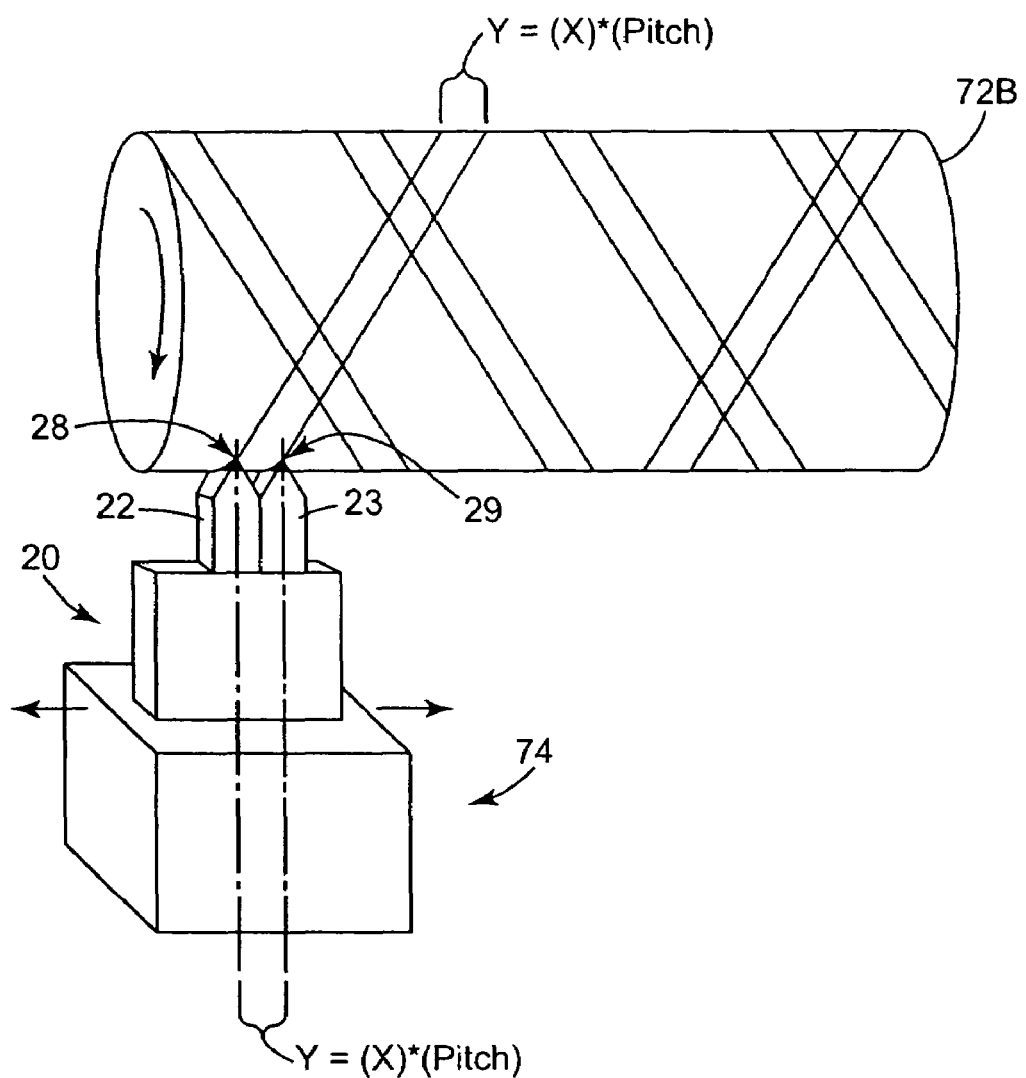
FIG. 8 is a conceptual perspective view of a multi-diamond plunge or thread cutting tool assembly simultaneously cutting two grooves during the creation of a microreplication tool.

FIGS. 7 and 8 are conceptual perspective views of multi-diamond cutting tool assemblies 10, 20 used to simultaneously cut two grooves during the creation of a microreplication tool 72A (FIG. 7) or 72B (FIG. 8). In the examples of FIGS. 7 and 8, the respective microreplication tool 72 comprises a casting roll, although other microreplication tools such as casting belts, injection molds, extrusion or embossing tools, or other work pieces could also be created using cutting tool assembly 10 or cutting tool assembly 20. As shown in FIG. 7, cutting tool assembly 10 may be secured to a drive shaft 16 which is attached to a motor (not shown) to rotate cutting tool assembly 10 about an axis. Cutting tool assembly 10 may also be moved relative to microreplication tool 72A in lateral directions (as illustrated by the arrows). At the same time, microreplication tool 72A may be rotated about an axis. As cutting tool assembly 10 is rotated, diamond tips 18 and 17 cut into the microreplication tool 72A in an alternating manner. Accordingly, two grooves are formed in a single cutting pass of cutting tool assembly 10 along microreplication tool 72A.

As shown in FIG. 8, cutting tool assembly 20 may be secured in a diamond tooling machine 74 that positions the cutting tool assembly 20 relative to microreplication tool 72B, and moves the cutting tool assembly 20, e.g., in lateral directions (as illustrated by the arrows) relative to the microreplication tool 72B. At the same time, microreplication tool 72B may be rotated about an axis. Diamond tooling machine 74 may be configured to pass the cutting tool assembly 20 into a rotating microreplication tool 72B via plunge or thread cutting techniques in order to cut grooves in the microreplication tool 72B. Alternatively, diamond tooling machine 74 may be configured for scribing or ruling, in which cutting tool assembly 20 is displaced through a work piece very slowly. In any case, grooves can be cut, and protrusions can be formed on the work piece. The formed grooves and protrusions may define the ultimate form of microreplicated structures created using the microreplication tool 72A (FIG.

7) or 72B (FIG. 8), for example, during an extrusion process. Alternatively, the formed grooves and protrusions may form features by displacement of material in a work piece other than a microreplication tool. In addition, the use of a fast tool servo could be employed between cutting tool assembly 20 and the machine tool 74 that receives the cutting tool assembly. For example, the fast tool servo can vibrate the cutting tool assembly 20 for creating of particular microstructures in microreplication tool 72B.

Because the cutting tool assembly 10, 20 implements multiple tool shanks, and thus multiple diamond cutting tips, fewer passes of the cutting tool assembly are needed to cut the grooves on the microreplication tool. This can reduce production costs and speed the production cycle associated with creation of microreplication tools. Creation of a work piece can take hours if not days in some cases. Incorporation of two or more diamond cutting tips within cutting tool assembly 10, 20 for simultaneous cutting of grooves can reduce the production cycle to a fraction of that time.

For example, if the cutting tool assembly includes two tool shanks each a defining diamond cutting tip (as illustrated in FIGS. 7 and 8), the number of passes required to cut grooves in the microreplication tool 72 can be reduced by one-half relative to an assembly that includes a single tool shank. Additional tool shanks may add further benefits in a similar manner. Also, multiple tips may be formed on one or both of the diamonds, which may add similar productivity benefits. Reducing costs associated with the creation of the microreplication tool 72, in turn, may effectively reduce the costs associated with the ultimate creation of microreplicated structures.

Figure 9:
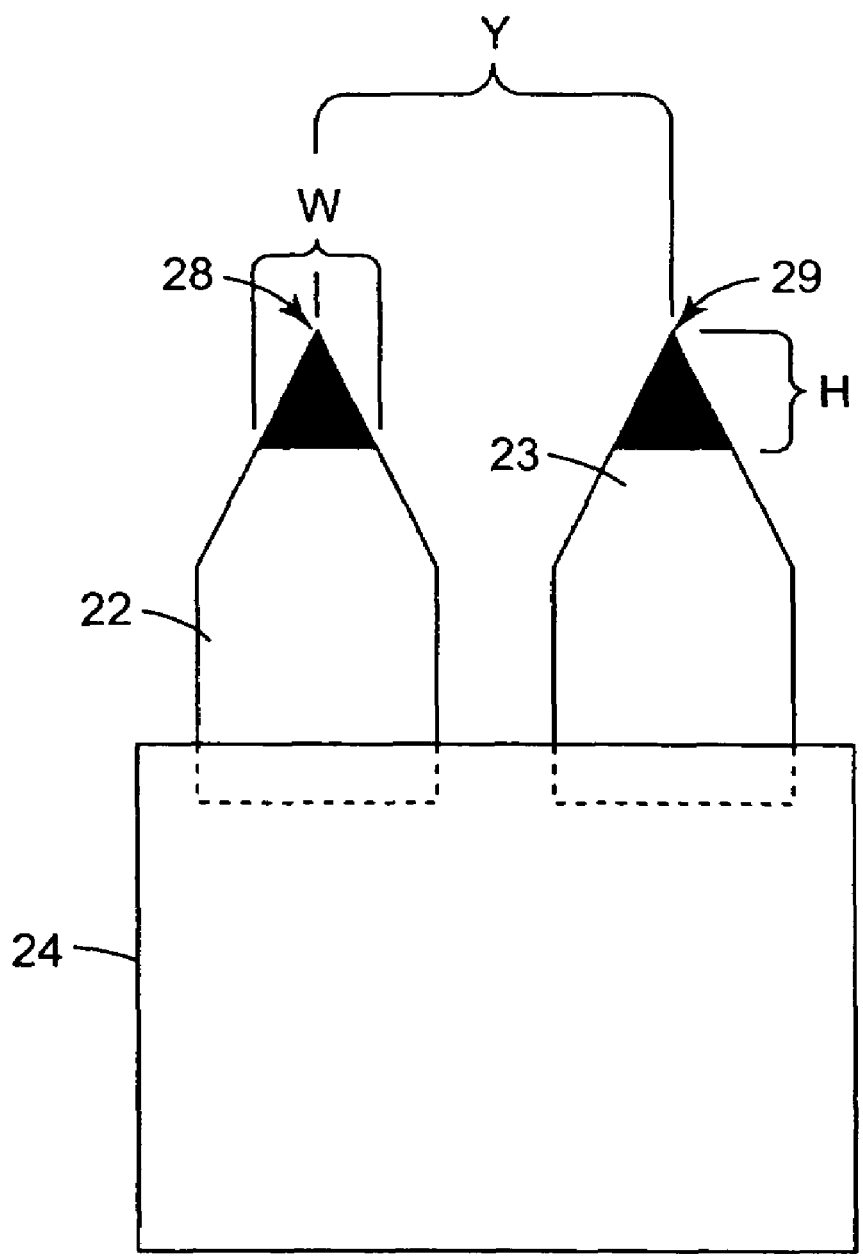
FIG. 9 is another top view of a multi-diamond plunge or thread cutting tool assembly.

The diamond tips of the tool shanks 12, 13 or 22, 23 may also be subject to a wide variety of sizes. The sizes of the tips may be defined by one or more variables as illustrated in FIG. 9, including the cutting height (H), the cutting width (W), and variable (Y) defined above. The cutting height (H) defines the maximum depth that the diamond can cut in a work piece, and may also be referred to as the cutting depth. The cutting width (W) may be defined as the average cutting width, or as labeled in FIG. 9, the maximum cutting width of a tip. The variable (Y) refers to the distance between adjacent tips, and is defined to be an integer number of pitch spacings. Another quantity that can be used to define the size of the cutting tips is referred to as the aspect ratio. The aspect ratio is the ratio of height (H) to width (W). Diamond tips created by focused ion beam milling processes can achieve various heights, widths, pitches, and aspect ratios.

Figure 10:
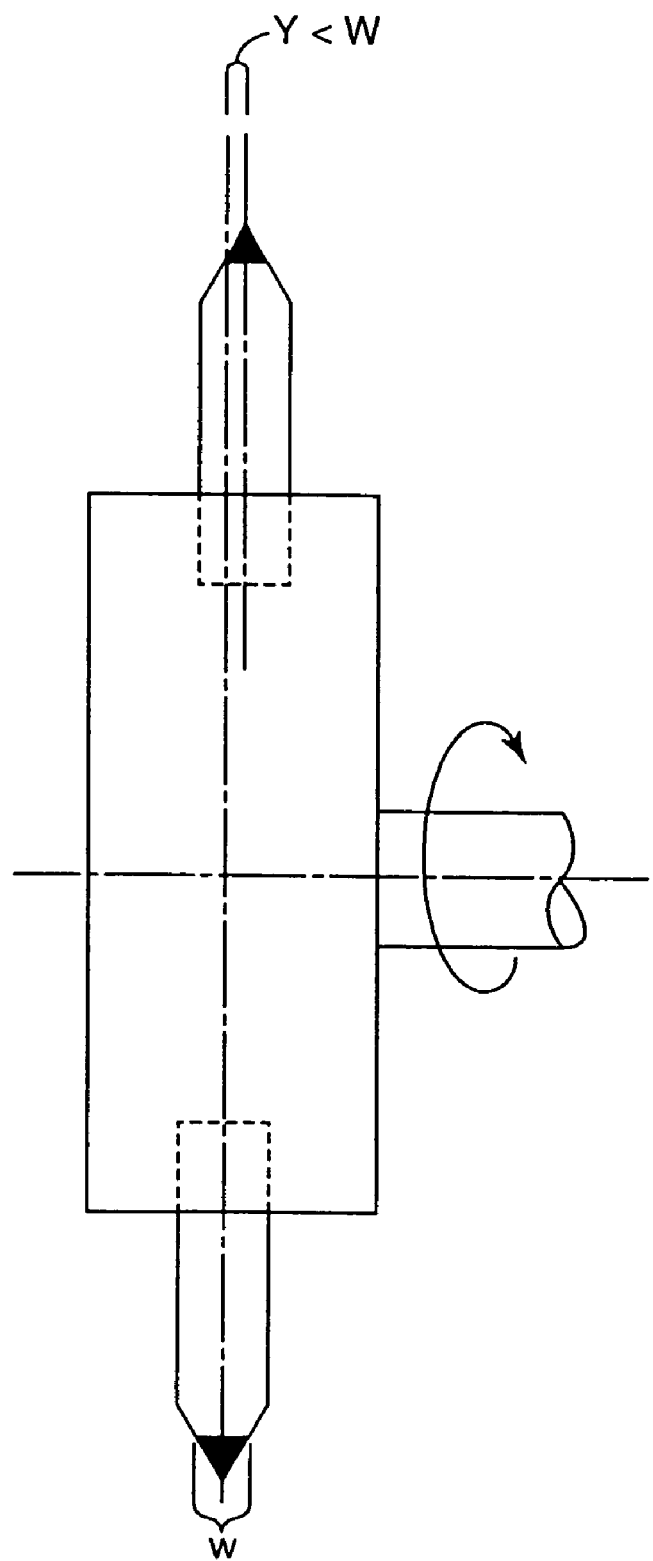
FIG. 10 is another top view of a multi-diamond fly cutting tool assembly.

For example, the height (H) and/or the width (W) can be formed to be less than approximately 500 microns, less than approximately 200 microns, less than approximately 100 microns, less than approximately 50 microns, less than approximately 10 microns, less than approximately 1.0 micron, or less than approximately 0.1 micron. Additionally, the variable Y may be defined to be less approximately 5000 microns, less than approximately 1000 microns, less than approximately 500 microns, less than approximately 200 microns, less than approximately 100 microns, less than approximately 50 microns, less than approximately 10 microns, less than approximately 5 microns, less than approximately 1.0 micron, and may approach a 0.5 micron tolerance. In some cases, as can be appreciated by FIG. 10 (and FIGS. 5 and 6), the distance Y may be less than the width of the tool shank, and may even be less than the cutting width W associated with the diamond tip.

The aspect ratio may be defined to be greater than approximately 1:5, greater than approximately 1:2, greater than approximately 1:1, greater than approximately 2:1, or greater than approximately 5:1. Larger or smaller aspect ratios may also be achieved using focused ion beam milling. These different shapes and sizes may be advantageous for various applications.

Focused ion beam milling refers to a process in which ions, such as gallium ions, are accelerated toward the diamond in order to mill away atoms of the diamond (sometimes referred to as ablation). The acceleration of gallium ions may remove atoms from the diamond on an atom by atom basis. Vapor enhancing techniques using water vapors may also be used to improve the focused ion beam milling process. One suitable focused ion beam milling machine is the Micrion model 9500, commercially available from FEI Inc. of Portland Oreg. In general, focused ion beam milling can be performed to create precision tipped diamonds that correspond to the features to be created. One exemplary provider of focused ion milling services that may be used to create one or more ion beam milled diamonds is Materials Analytical Services of Raleigh, N.C.

Focused ion beam milling is generally very expensive. Therefore, to reduce the costs associated with the creation of a multi-tipped diamond, it is desirable to initially process the diamond tip to be ion beam milled prior to submitting the diamond tip to the focused ion beam milling process. For example, less expensive techniques such as lapping or grinding may be used to remove significant portions of the diamond tip. The focused ion beam milling process may ensure that one or more of the dimensions or features listed above can be achieved. Still, by initially processing the diamond tip prior to focused ion beam milling, the amount of focused ion beam milling time required to create the final ion beam milled diamond tip can be reduced. Lapping refers to a process of removing material from the diamond using a loose abrasive, whereas grinding refers to a process in which material is removed from the diamond using an abrasive that is fixed in a medium or substrate.

Figure 11A:
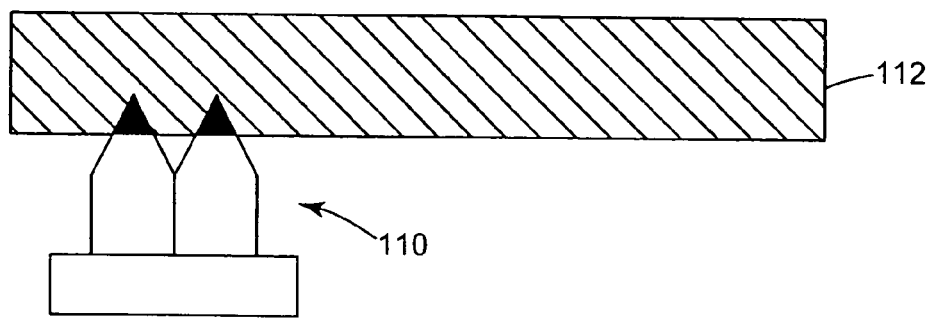
FIGS. 11A-11C are various cross-sectional top views illustrating a multi-diamond cutting tool assembly cutting grooves into a work piece, and the resultant grooves and protrusions that can be formed in the work piece.
Figure 11B:
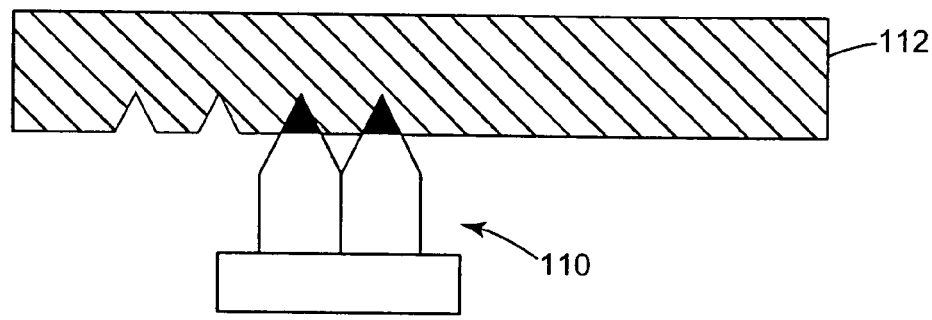
Figure 11C:
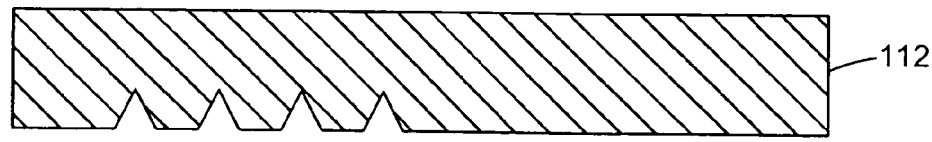

FIGS. 11A-11C are cross-sectional top views illustrating a cutting tool assembly 110 cutting grooves into a work piece 112. In the example, of FIGS. 11A-11C, the distance (Y) quantified above would be equal to the pitch. In other words, the integer value (X) defined above would be equal to one, and thus because:

$Y=(X)*(\text{Pitch})$, $Y=\text{Pitch}$, when $X=1$.

In particular, FIG. 11A is a cross-sectional top view illustrating a multi-diamond cutting tool assembly 110 cutting a first set of grooves into work piece 112, and FIG. 11B is a cross-sectional top views illustrating cutting tool assembly 110 cutting a second set of grooves into work piece 112. FIG. 11C is a top view illustrating the created work piece after only two passes of cutting tool assembly 110. Work piece 112 may correspond to a microreplication tool as outlined above, although the invention is not necessarily limited in that respect. A similar cutting technique may be performed with a tool configured for fly cutting, with Y=Pitch.

FIGS. 12A-12D are cross-sectional top views illustrating a multi-diamond cutting tool assembly 120 cutting grooves into a work piece 122. In the example of FIGS. 12A-12D, the integer value (X) defined above would be equal to 3, and thus because:

$Y=(X)*(\text{Pitch})$, $Y=3*\text{Pitch}$, when $X=3$.

Figure 12A:
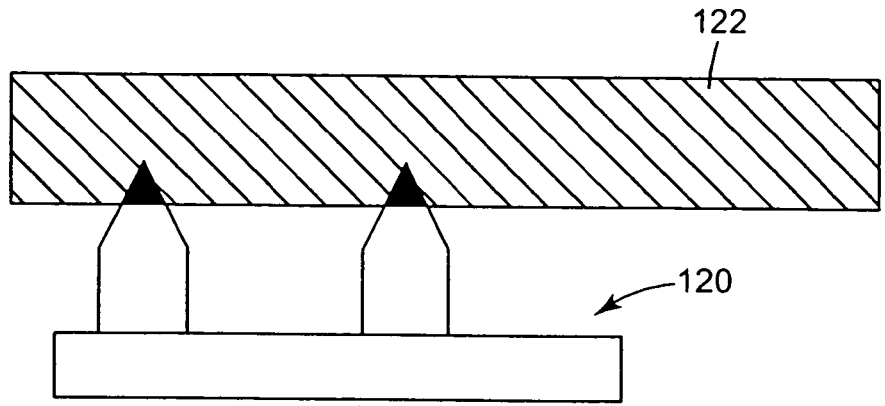
FIGS. 12A-12D are additional cross-sectional top views illustrating a multi-diamond cutting tool assembly cutting grooves into a work piece, and the resultant grooves and protrusions that can be formed in the work piece.
Figure 12B:
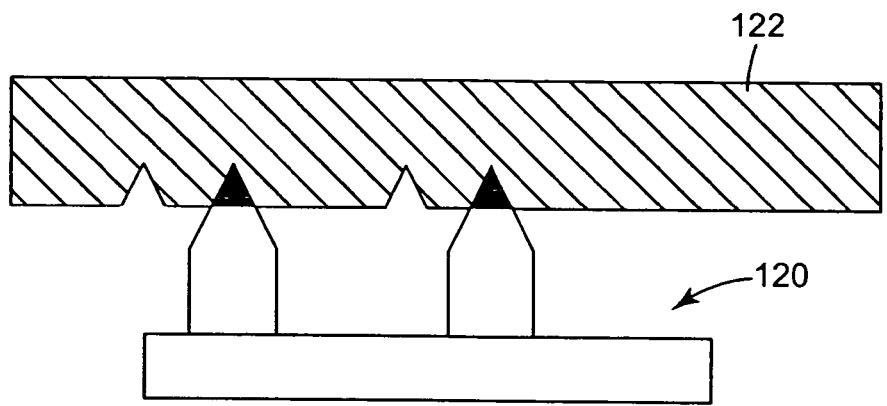
Figure 12C:
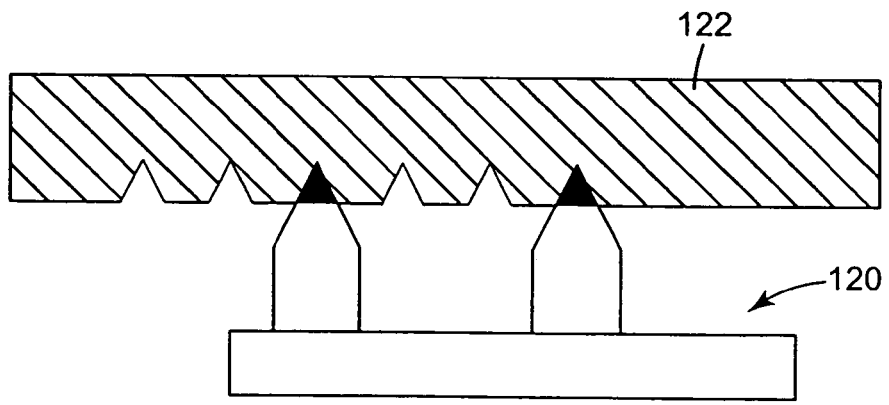
Figure 12D:
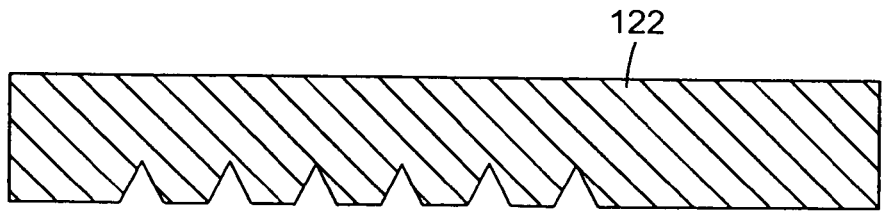

In particular, FIG. 12A is a cross-sectional top view illustrating cutting tool assembly 120 cutting a first set of grooves into work piece 122, FIG. 12B is a cross-sectional top view illustrating cutting tool assembly 120 cutting a second set of grooves into work piece 122, and FIG. 12C is a cross-sectional top view illustrating cutting tool assembly 120 cutting a third set of grooves into work piece 122. FIG. 12D is a top view illustrating the created work piece after only three passes of cutting tool assembly 120. Again, work piece 122 may correspond to a microreplication tool as outlined above, although the invention is not necessarily limited in that respect. Also, a similar cutting technique may be performed with a cutting tool assembly configured for fly cutting, with Y=3*Pitch.

Figure 13:
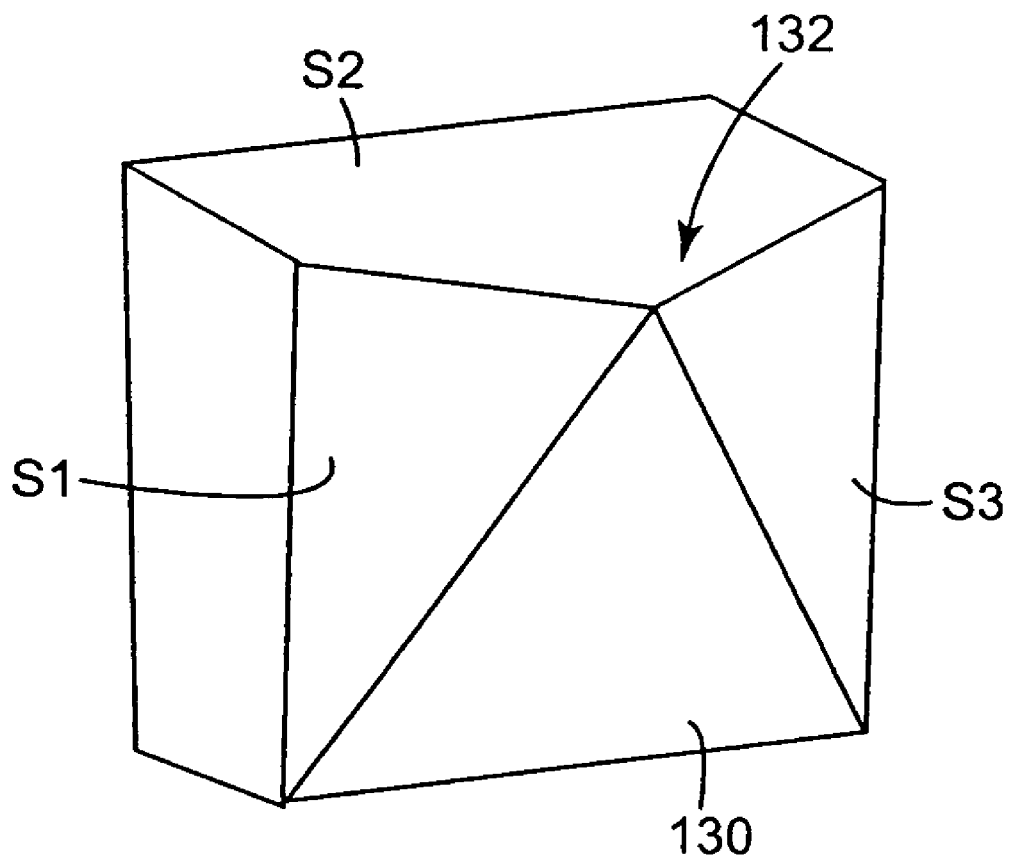
FIG. 13 is a perspective view of a diamond that can be used in a multi-diamond cutting tool assembly.

FIG. 13 is a perspective view of a diamond 130 that can be secured into a tool shank and then used in a cutting tool assembly. Diamond 130 may correspond to any of diamond tips 17, 18, 28, 29 described above. As shown in FIG. 13, diamond 130 may define a cutting tip 132 defined by at least three surfaces (S1-S3). Surfaces S1, S2 and S3 may be created by grinding or lapping techniques, and may be perfected by focused ion beam milling techniques.

FIGS. 14-27 are top views of cutting tool assemblies according to various embodiments of the invention. FIGS. 14, 16, 18, 20, 22, 24 and 26 illustrate assemblies configured for plunge cutting, thread cutting, scribing or ruling, whereas FIGS. 15, 17, 19, 21, 23, 25 and 27 illustrate assemblies configured for flycutting. As can be appreciated by the examples of FIGS. 14-27, the tips of the diamonds in the respective tool shanks may be formed to have any of a wide variety of shapes and sizes.

For example, as shown in FIGS. 14 and 15, diamond tips 145-148 of tool shanks 141-144 may define substantially rectangular shapes. As shown in FIGS. 16 and 17 diamond tips 165-168 of tool shanks 161-164 may define tapered shapes with flat tops. In that case, the side walls defined by diamond tips 165-168 may taper such that diamond tips 165-168 define pyramid-like shapes with flat tops. The side walls defined by diamond tips 165-168 may form obtuse angles relative to the surface of mounting structures 169, 170.

Figure 20:
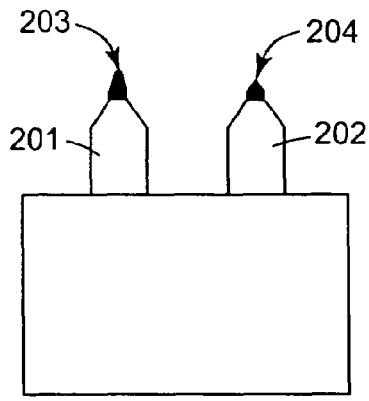
Figure 21:
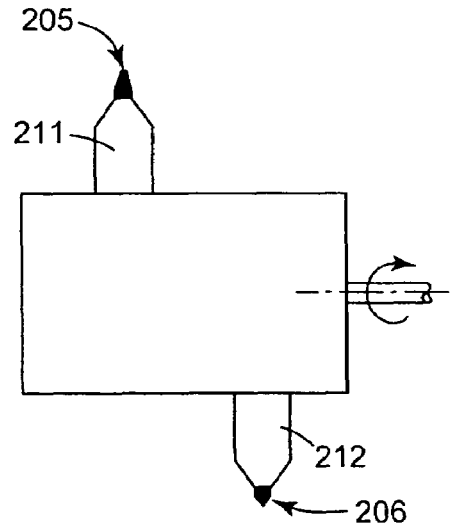
Figure 22:
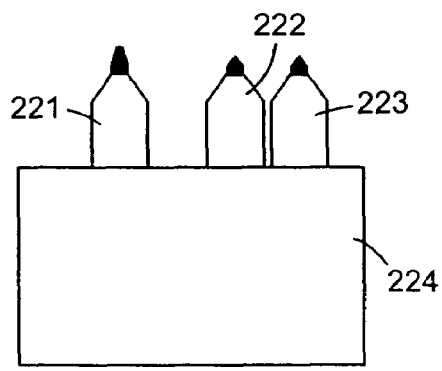
Figure 23:
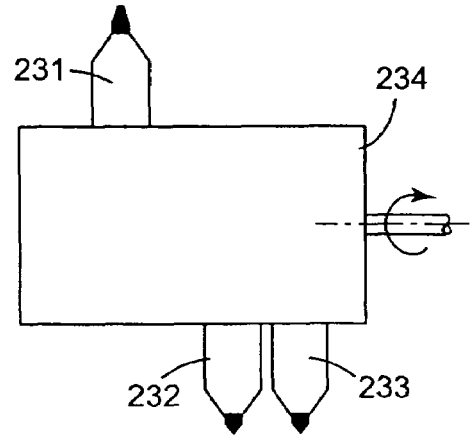
Figure 24:
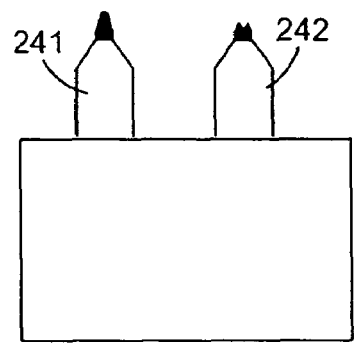
Figure 25:
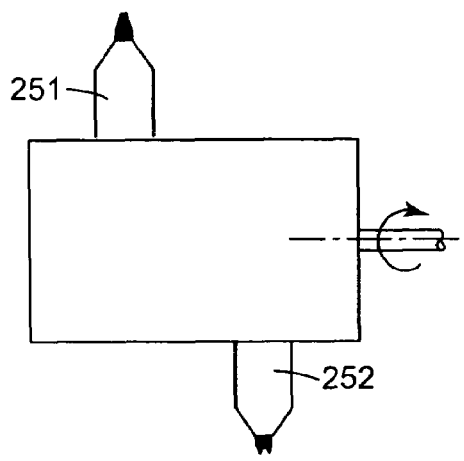
Figure 26:
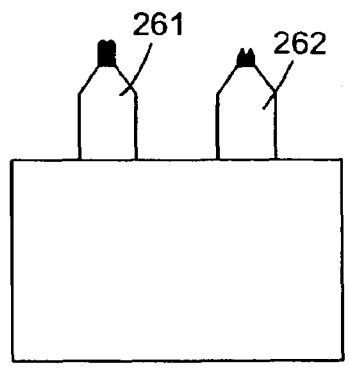
Figure 27:
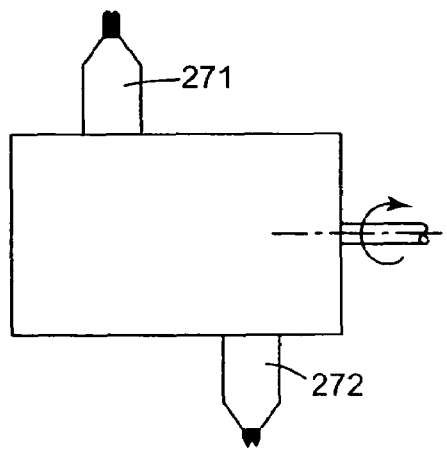

As shown in FIGS. 18 and 19, diamond tips 185-188 of tool shanks 181-184 define undercut side walls. In other words, side walls defined by diamonds 185-188 may form acute angles relative to the surface of mounting structures 189, 190. As shown in FIGS. 20 and 21, the different diamond tips 203, 204, 205, 206 of tool shanks 201 and 202 (FIG. 20) and 211 and 212 (FIG. 21) may define different shapes and sizes. In other words, a shape of the first diamond tip 203, 205 defined by first tool shank 201, 211 may be substantially different from a shape of the second diamond tip 204, 206 defined by second tool shank 202, 212. Such a configuration may be particularly useful for the creation of optical films. In that case, the first diamond tip 203, 205 defined by first tool shank 201, 211 may define a first optical characteristic to be created in the optical film, and the second diamond tip 204, 206 defined by second tool shank 202, 212 may define a second optical characteristic to be created in the optical film. Additional diamonds assuming various other shapes may add similar benefits. For example, as shown in FIGS. 22 and 23, three or more tool shanks 221, 222, 223 (FIG. 22), 231, 232, 233 (FIG. 23) may be positioned in a mounting structure 224, 234 to define three or more diamond tips for simultaneously cutting grooves during a single cutting pass of the tool. In other uses, two or more diamonds may be secured in a tool shank as described herein, and then used to cut the same groove, e.g., with deeper and deeper cuts being made by different diamonds during subsequent passes of the tool. In other words, a first diamond in the sank may cut a shallow groove with a second diamond in the shank cutting the same groove to a deeper depth during the next pass. Other shapes may also be cut during such subsequent passes.

As can be appreciated by FIGS. 24-27, one or both of the tool shanks 241, 242 (FIG. 24); 251, 252 (FIG. 25); 261, 262 (FIG. 26); or 271, 272 (FIG. 27) may be formed with diamonds that define multiple tips per diamond. In particular, as illustrated, tool shanks 242, 252, 261, 262, 271 and 272 are formed with multi-tipped diamonds. For example, multi-tipped ion beam milled diamonds as described in copending and commonly assigned U.S. application Ser. No. 10/159,925, filed May 29, 2002 for Bryan et al. and entitled "Diamond Tool with a Multi-Tipped Diamond" may be used in accordance with the principles of this disclosure. The entire content of U.S. application Ser. No. 10/159,925 is hereby incorporated by reference herein. These and other formations of diamonds may be desirable for various applications. Accordingly, these and many other variations of the invention are within the scope of the claims. A number of embodiments have been described. For example, multi-diamond cutting tool assembly has been described for use in diamond tooling machines. Nevertheless, various modifications can be made to the embodiments described above without departing from the scope of the following claims. For example, the cutting tool assembly may be used to cut grooves or other features into other types of work pieces, e.g., work pieces other than microreplication tools. Accordingly, other implementations and embodiments are within the scope of the following claims.

The invention claimed is:

1. A method comprising:
defining a pitch spacing for microreplicated features of a microreplicated structure to be created by a microreplication tool that comprises a cylindrical roll;
creating a cutting tool assembly to cut grooves in the microreplication tool by positioning first and second tool shanks in a mounting structure such that a cutting location of a first diamond tip associated with the first tool shank is a defined distance from a cutting location of a second diamond tip associated with the second tool shank, the defined distance corresponding to an integer number of the pitch spacing, wherein the defined distance is accurate to within a tolerance of less than approximately 10 microns;
creating the microreplication tool using the cutting tool assembly by cutting the grooves; and
creating microreplicated structures using the microreplication tool, wherein the microreplicated structures define the microreplicated features at the pitch spacing.

2. The method of claim 1, wherein creating the microreplicated structures comprises creating mechanical fasteners that define self-mating profiles.

3. The method of claim 1, wherein creating the microreplicated structures comprises creating optical films using the microreplication tool.

4. The method of claim 3, wherein a shape of the first diamond tip is substantially different from a shape of the second diamond tip, and wherein the first diamond tip defines a first optical characteristic to be created in the optical film and the second diamond tip defines a second optical characteristic to be created in the optical film.

5. The method of claim 1, further comprising positioning a third tool shank in the mounting structure, the third tool shank defining a third diamond tip that corresponds to a third groove to be created in the microreplication tool, wherein a cutting location of the third tip is a second defined distance from the cutting location of the second diamond tip, the second defined distance being accurate to a tolerance of less than approximately 10 microns.

6. The method of claim 1, wherein positioning first and second tool shanks includes adjusting a position of the tool shanks relative to one another under a tooling microscope in response to positioning feedback.

7. The method of claim 1, wherein the defined distance is accurate to within a tolerance of less than approximately 1 micron.

8. The method of claim 1, wherein positioning the first and second tool shanks comprises positioning the cutting location of the first diamond tip to be approximately one pitch spacing from the cutting location of the second diamond tip.

9. The method of claim 1, wherein the pitch spacing is less than approximately 1000 microns.

10. The method of claim 9, wherein the pitch spacing is less than approximately 100 microns.

11. The method of claim 10, wherein the pitch spacing is less than approximately 10 microns.

12. The method of claim 11, wherein the pitch spacing is less than approximately 1 micron.

13. The method of claim 1, wherein an aspect ratio of a cutting height of the first diamond tip relative to a cutting width of the first diamond tip is greater than approximately 1 to 1.

14. The method of claim 1, wherein a shape of the first diamond tip is substantially different from a shape of the second diamond tip.

15. The method of claim 1, wherein the cutting tool assembly is a flycutting assembly configured to be rotated about an axis perpendicular to a cutting direction of the diamond tips.

16. The method claim 15, where the defined distance is less than a width associated with either of the first and second tool shanks.

17. A method of creating microreplicated structures comprising:
    defining features for the microreplicated structures at a defined pitch spacing;
    creating a cutting tool assembly to cut grooves into a microreplication tool that comprises a cylindrical roll by positioning first and second tool shanks in a mounting structure such that a cutting location of a first diamond tip associated with the first tool shank is a defined distance from a cutting location of a second diamond tip associated with the second tool shank, the defined distance corresponding to an integer number of the defined pitch spacing, wherein the defined distance is accurate to within a tolerance of less than approximately 10 microns;
    cutting grooves into the microreplication tool using the cutting tool assembly; and
    creating the microreplicated structures using the microreplication tool, wherein the grooves of the microreplication tool define the features in the microreplication structures at the defined pitch spacing.

18. The method of claim 17, wherein the microreplicated structures comprise one of: mechanical fasteners that define a self-mating profile, and
    optical films that include one or more optical characteristics defined by the grooves of the microreplication tool created by the diamond tips of the cutting tool assembly.

\* \* \* \* \*